D. H. MOSTELLER.
ICE CREAM SCRAPER.
APPLICATION FILED JAN. 16, 1908.
916,353.
Patented Mar. 23, 1909.
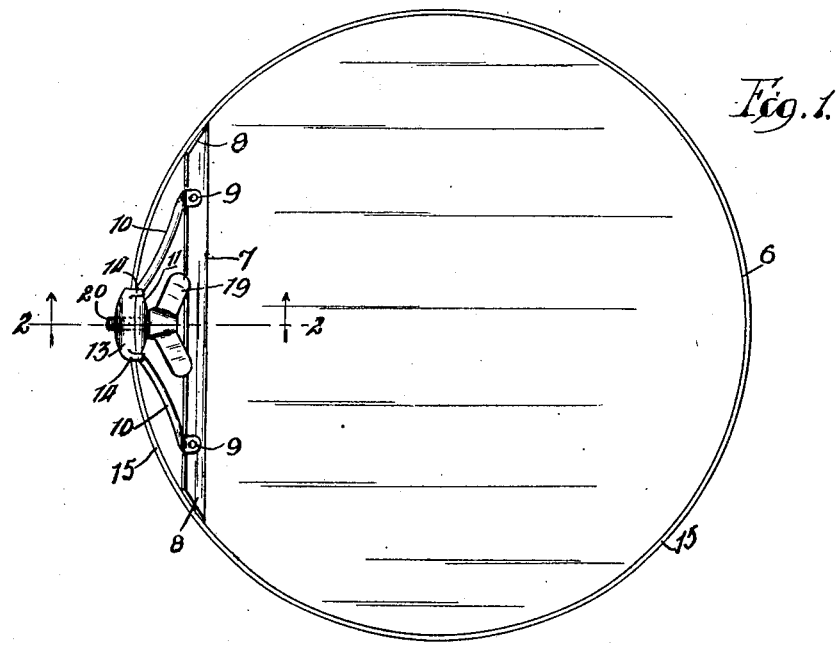
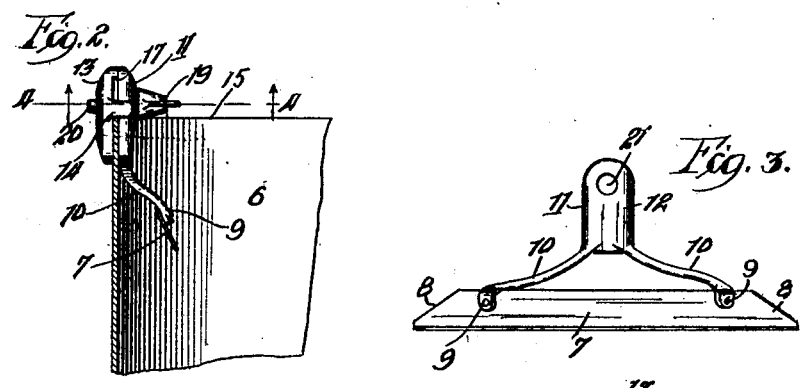
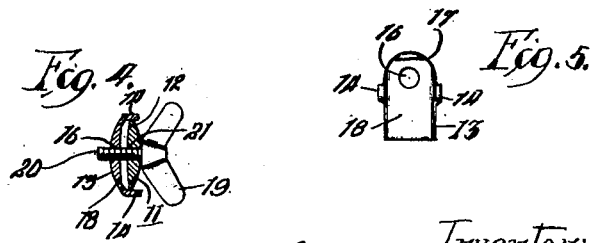
Witnesses:
Inventor:

UNITED STATES PATENT OFFICE.

DOSIER H. MOSTELLER, OF CHICAGO, ILLINOIS, ASSIGNOR TO THE MOSTELLER MANUFACTURING COMPANY, OF CHICAGO, ILLINOIS, A CORPORATION OF ILLINOIS.

ICE-CREAM SCRAPER.

No. 916,353.　　　　Specification of Letters Patent.　　Patented March 23, 1909.

Application filed January 16, 1908. Serial No. 411,188.

*To all whom it may concern:*

Be it known that I, DOSIER H. MOSTELLER, a citizen of the United States, residing at Chicago, in the county of Cook and State of Illinois, have invented certain new and useful Improvements in Ice-Cream Scrapers, of which the following is a specification.

One of the undesirable features incident to the dishing out of ice cream is the fact that an unequal amount is given to the various purchasers, thereby causing dissatisfaction to the customers as well as loss to the storekeeper, due to lack of means for always providing a certain definite amount.

The scraper of the present invention is intended to be used in connection with an ice cream can of cylindrical formation, and is adapted to be positioned in close proximity to the inner upper edge of the body of the can.

One of the objects of my invention is to provide suitable means whereby a person dishing out ice cream may be readily enabled to quickly and accurately dispense the amount desired.

Another object is to construct an ice cream scraper in such manner as to render it thoroughly efficient in use as well as to occupy a minimum of space, so as not to hinder or retard in the least the attendant in dishing out the ice cream; and the final object is to construct the device in such a simple and economical manner as to permit of its universal use.

In the drawings illustrating the invention Figure 1 is a top or plan view showing my improved scraper secured to an ice cream can, the cover having been removed; Fig. 2 an end elevation of the scraper, and showing a portion of the can in transverse section taken on line 2—2 of Fig. 1 looking in the direction of the arrow; Fig. 3 a side elevation of the scraper bar and the inner clamping member; Fig. 4 a horizontal section taken on line 4—4 of Fig. 2 looking in the direction of the arrow; and Fig. 5 an inner side elevation of the outer independent clamping member.

My improved ice cream scraper is adapted to be used in connection with an ice cream can 6 of cylindrical formation, and consists essentially of a longitudinal scraper bar 7 having its ends 8 cut obliquely so as to conform to the general curvature and contour of the can. This elongated scraper bar 7 is secured preferably by rivets or screws 9 to diagonally disposed retaining arms 10, which arms merge at their upper ends into the inner clamping member 11, the inner contacting surface 12 of which is of convex formation.

The outer clamping member 13 has a pair of lugs 14 extending inwardly which are adapted to engage on their under side the rim or collar 15 of the ice cream can. In the upper portion of this outer independent clamping member 13 is formed a threaded opening 16, and above said opening is formed a transverse ledge or shoulder 17, it being understood that the inner contacting surface 18 is concavely formed.

A butterfly nut 19, having a threaded stem 20, is adapted to be inserted slightly above the scraper bar through an opening 21 formed in the inner clamping member 11, said opening registering with the threaded opening 16 of the outer independent clamping member 13.

It will thus be seen that the device as a whole can be readily assembled and positioned when desired, and when not needed it can be quickly removed from the ice cream can by simply manipulating the butterfly nut 19 which, when unscrewed, permits the respective clamping members to become disengaged from the collar or rim of the ice cream receptacle. The device, furthermore, is capable of having its various parts readily cleaned or repaired, owing to its simplicity of construction. The ledge or shoulder formed at the upper end of the outer independent clamping member is used primarily to prevent binding of the threaded stem of the butterfly nut; and the slightly convex and concave formation of the inner contacting surfaces serves, in a measure, to facilitate the clamping operation as well as to insure the efficiency of the clamping mechanism during long continued use.

What I claim as new and desire to secure by Letters Patent is:

1. An ice cream scraper, comprising an elongated scraper bar, an outer independent clamp member having its inner contacting face of concave formation, an inner clamp member secured to the scraper bar and having its inner contacting face of convex formation, and means for positively retaining the aforesaid clamp members together, substantially as described.

2. An ice cream scraper, comprising an elongated scraper bar, an outer clamp member having lugs formed thereon adapted to contact the rim of an ice cream can on the under side thereof, an inner clamp member secured to the scraper bar, and means for positively retaining the aforesaid clamp members together, substantially as described.

3. The combination with an ice cream can of an ice cream scraper comprising an elongated scraper bar, an outer independent clamp member having lugs formed on its respective sides, an inner clamp member secured to the scraper bar, an ice cream can, and means for retaining the clamp members to the ice cream can, substantially as described.

4. The combination with an ice cream can of an ice cream scraper comprising an elongated scraper bar, an outer independent clamp member having its inner contacting face of concave formation, an inner clamp member secured to the scraper bar and having its inner contacting face of convex formation, an ice cream can, and means for retaining the respective clamp members to the ice cream can, substantially as described.

DOSIER H. MOSTELLER.

Witnesses:
WALKER BANNING,
SAMUEL W. BANNING.